United States Patent
Prasad

(10) Patent No.: US 10,227,039 B1
(45) Date of Patent: Mar. 12, 2019

(54) WARNING SYSTEM

(71) Applicant: Delphi Technologies, LLC, Troy, MI (US)

(72) Inventor: Premchand Krishna Prasad, Westfield, IN (US)

(73) Assignee: DELPHI TECHNOLOGIES, LLC, Troy, MI (US)

(*) Notice: Subject to any disclaimer, the term of this patent is extended or adjusted under 35 U.S.C. 154(b) by 0 days.

(21) Appl. No.: 15/906,024

(22) Filed: Feb. 27, 2018

Related U.S. Application Data

(60) Provisional application No. 62/632,148, filed on Feb. 19, 2018.

(51) Int. Cl.
 B60W 50/14 (2012.01)
 B60Q 9/00 (2006.01)
 B60W 40/08 (2012.01)

(52) U.S. Cl.
 CPC .............. B60Q 9/00 (2013.01); B60W 50/14 (2013.01); B60W 2040/0818 (2013.01); B60W 2540/18 (2013.01); B60W 2550/146 (2013.01)

(58) Field of Classification Search
 CPC ......... B60Q 9/00; B60W 50/14; B60W 50/16; B60W 2550/146; B60W 2040/0818; B60W 2540/18; B60W 40/072; B62D 1/286; G08G 1/161; G08G 1/165
 See application file for complete search history.

(56) References Cited

U.S. PATENT DOCUMENTS

| | | | | |
|---|---|---|---|---|
| 5,670,963 A * | 9/1997 | Kubota | ................. | G01S 7/4026 342/70 |
| 6,381,525 B1 * | 4/2002 | Hori | ..................... | B62D 5/0457 180/446 |
| 6,393,361 B1 * | 5/2002 | Yano | ........................ | B60T 7/14 340/436 |
| 6,691,018 B1 * | 2/2004 | Miyahara | ........... | B60K 31/0008 340/435 |
| 6,763,318 B1 * | 7/2004 | Winter | .................... | G01S 13/93 33/288 |

(Continued)

Primary Examiner — Hoi C Lau
(74) Attorney, Agent, or Firm — Joseph Victor Bonadies

(57) ABSTRACT

A warning system includes an angle-detector, a curvature-detection-means, an alert-device, and a controller-circuit. The angle-detector indicates a steering-angle of a hand-wheel of a host-vehicle. The curvature-detection-means detects a curvature of a portion of a roadway traveled by the host-vehicle characterized as ahead of the host-vehicle. The alert-device is operable to alert an operator of the host-vehicle of driver-fatigue. The controller-circuit is in communication with the angle-detector, the curvature-detection-means, and the alert-device. The controller-circuit is configured to determine an average-steering-angle, determine an expected-steering-angle based on the curvature detected by the curvature-detection-means, determine a steering-angle-deviation based on the average-steering-angle and the expected-steering-angle, determine whether the steering-angle-deviation is greater than a predetermined deviation-threshold, determine a frequency of the steering-angle-deviation, and activate the alert-device when the frequency of the steering-angle-deviation exceeds a change-threshold.

17 Claims, 4 Drawing Sheets

(56) References Cited

U.S. PATENT DOCUMENTS

| | | | |
|---|---|---|---|
| 2003/0156015 A1* | 8/2003 | Winner | B60K 31/0008 340/425.5 |
| 2004/0186651 A1* | 9/2004 | Tange | B60K 31/04 701/96 |
| 2006/0131093 A1* | 6/2006 | Egami | B60W 50/16 180/272 |
| 2007/0046239 A1* | 3/2007 | Hashizume | B60Q 1/12 318/575 |
| 2012/0089297 A1* | 4/2012 | Shimizu | B60W 40/072 701/29.7 |
| 2012/0283912 A1* | 11/2012 | Lee | B62D 1/286 701/41 |
| 2014/0142780 A1* | 5/2014 | Chen | B60W 40/072 701/1 |
| 2014/0341432 A1* | 11/2014 | Ichida | G08G 1/165 382/103 |
| 2015/0294571 A1* | 10/2015 | Shida | G08G 1/161 701/409 |
| 2017/0036694 A1* | 2/2017 | Okuda | B62D 6/02 |
| 2017/0245743 A1* | 8/2017 | Miyahara | A61B 1/00117 |

\* cited by examiner

WARNING SYSTEM

TECHNICAL FIELD OF INVENTION

This disclosure generally relates to a warning system, and more particularly relates to a driver-fatigue warning system that does not penalize a driver for steering deviations while driving on a curved roadway.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

A typical driver-fatigue warning system detects whether an operator of a host-vehicle is drowsy or fatigued by tracking a variation in an angle of a hand-wheel of the host-vehicle that deviates from a centered-position. A typical non-drowsy driver exhibits more numerous steering corrections of small magnitude relative to the centered-position, compared to a typical fatigued driver who exhibits fewer numbers of corrections of larger magnitude relative to the centered-position. While the typical driver-fatigue warning system may accurately estimate the driver-fatigue while driving on straight roadways where hand-wheel is expected to be in the centered-position, situations exist where the operator may be driving for long durations on curved roadways where the angle of the hand-wheel may be biased to one side of the centered-position. While this bias may be due to the driver following the roadway, the bias may be erroneously counted by the typical driver-fatigue warning system as an indication of driver-fatigue, and may lead to a false driver-fatigue warning. As will be described in more detail below, the system described herein is an improvement over prior driver-fatigue warning systems because the system reduces the rates of false driver-fatigue warnings by determining an expected hand-wheel bias based on a curvature of the roadway, which may help to reduce occurrences of operators intentionally deactivating the driver-fatigue warning system.

Figure 1:
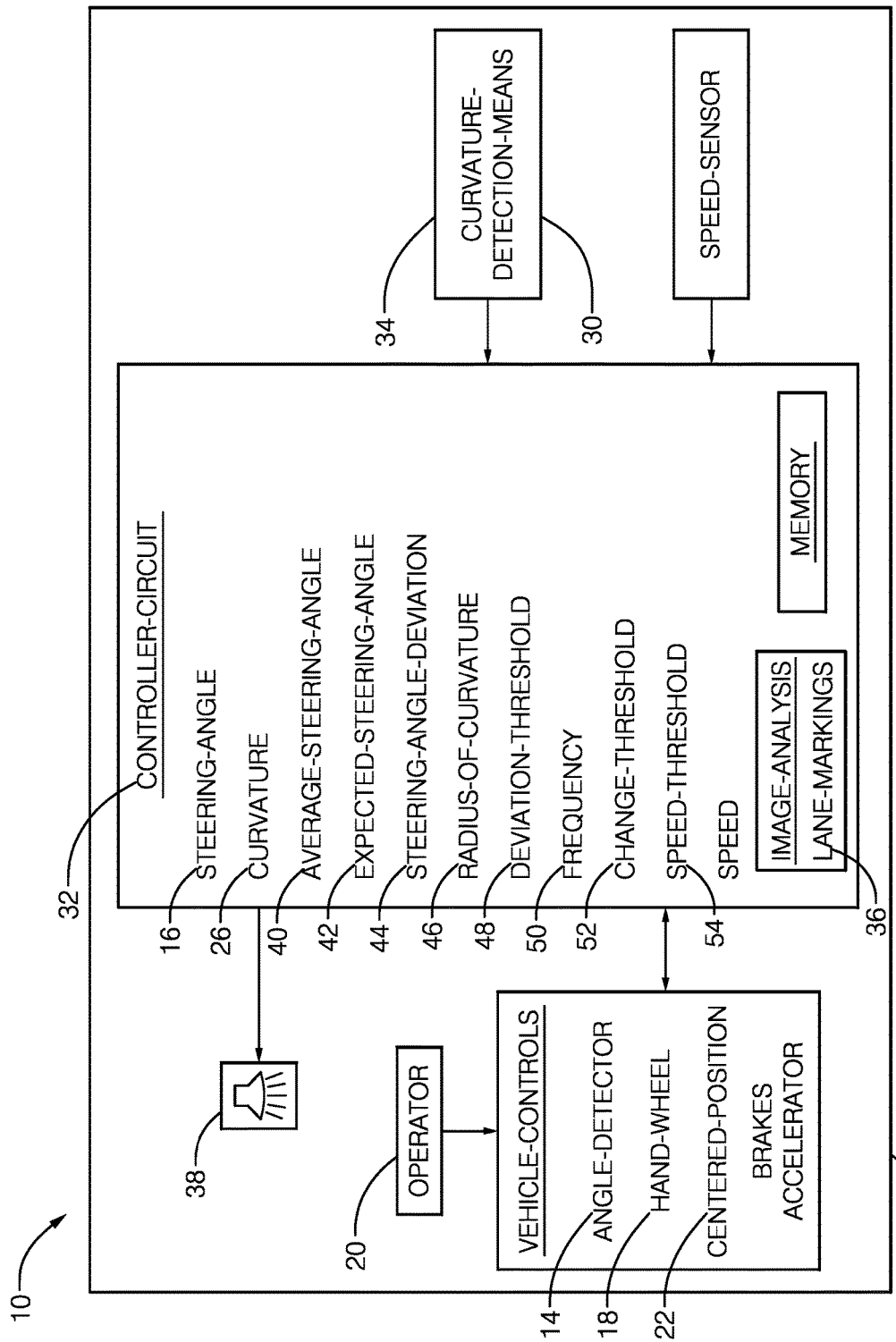
FIG. 1 is an illustration of a warning system in accordance with one embodiment.

FIG. 1 illustrates a non-limiting example of a warning system 10, hereafter referred to as the system 10, installed on a host-vehicle 12. The system 10 includes an angle-detector 14 that indicates a steering-angle 16 of a hand-wheel 18 of the host-vehicle 12. The typical angle-detector 14 outputs an electronic signal (e.g. voltage or digital) that is indicative of the steering-angle 16 of the hand-wheel 18 which is converted into the steering-angle 16 measurement through a calibrated electrical-circuit. The calibrated electrical-circuit may be integral to the angle-detector 14, or may be separate from the angle-detector 14. As used herein, the hand-wheel 18 is used by an operator 20 of the host-vehicle 12 to steer the host-vehicle 12. The steering-angle 16 is a measure of a rotational-angle that the hand-wheel 18 is moved away from a centered-position 22 and includes both positive and negative values. It will be understood that the centered-position 22 of the hand-wheel 18 enables the host-vehicle 12 to travel in a straight line. For example, a fifteen-degree (15-degree) rotation of the hand-wheel 18 to a left-side of the operator 20 (i.e. counter-clockwise) may be measured as a negative 15-degree steering-angle 16, while the 15-degree rotation of the hand-wheel 18 to a right-side may of the operator 20 (i.e. clockwise) be measured as a positive 15-degree steering-angle 16.

The system 10 also includes a curvature-detection-means 24 that detects a curvature 26 of a portion of a roadway 28 traveled by the host-vehicle 12 that lies ahead of the host-vehicle 12 in the direction of travel. In the example illustrated in FIG. 1, the curvature-detection-means 24 is a digital-map 30 that detects the curvature 26 based on a location of the host-vehicle 12 on the roadway 28. The digital-map 30 may be located on-board the host-vehicle 12 and may be integrated into a controller-circuit 32. The digital-map 30 may be stored 'in the cloud' and accessed via a transceiver (e.g. Wi-Fi, cellular, satellite—not shown). The digital-map 30 and transceiver may also be part of a location-device (e.g. GPS—not shown). The controller-circuit 32 may also include an internet-transceiver (not shown) that updates the digital-map 30 with curvature 26 information. The internet-transceiver may be any internet-transceiver suitable for automotive applications and may include Wi-Fi, cellular, and satellite devices (not shown). Any of the known digital-maps 30 that include curvature 26 data for the roadway 28 traveled by the host-vehicle 12 may be used by the system 10, such as the digital-maps 30 produced by HERE Global B.V. of Eindhoven, Netherlands and TomTom International B.V. of Amsterdam, Netherlands. In another embodiment the curvature-detection-means 24 is a camera 34 that detects the curvature 26 based on lane-markings 36 on the roadway 28, using the known methods of lane-detection from cameras 34 produced by Mobileye N.V of Jerusalem, Israel. In yet another embodiment, both the digital-map 30 and the camera 34 are used by the system 10 to detect the curvature 26 of the portion of a roadway 28, with the digital-map 30 providing an initial detection of the curvature 26 and the camera 34 providing a confirmation of the curvature 26 detection. The curvature 26 is characterized by a direction in which a tangent-vector rotates along the curve and has both positive values and negative values. For example, if the curvature 26 of the roadway 28 is counter-clockwise relative to the travel direction the roadway 28 will have a positive curvature 26, and if the curvature 26 of the roadway 28 is clockwise the roadway 28 will have a negative curvature 26.

The system 10 also includes an alert-device 38 operable to alert the operator 20 of the host-vehicle 12 of driver-fatigue. The alert-device 38 may be an indicator viewable by the operator 20 that is illuminated to indicate an instance of driver-fatigue, and/or an audible alarm, and/or a vibratory alarm that is activated to indicate the same. In the example illustrated in FIG. 1 the alert-device 38 is an audible alarm.

The system 10 also includes the controller-circuit 32 in communication with the angle-detector 14, the curvature-detection-means 24, and the alert-device 38. The controller-circuit 32 may include a processor (not shown) such as a microprocessor or other control circuitry such as analog and/or digital control circuitry including an application specific integrated circuit (ASIC) for processing data as should be evident to those in the art. The controller-circuit 32 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of driver-fatigue exists based on signals received by the controller-circuit 32 from angle-detector 14 and the curvature-detection-means 24, as described herein.

Figure 2:
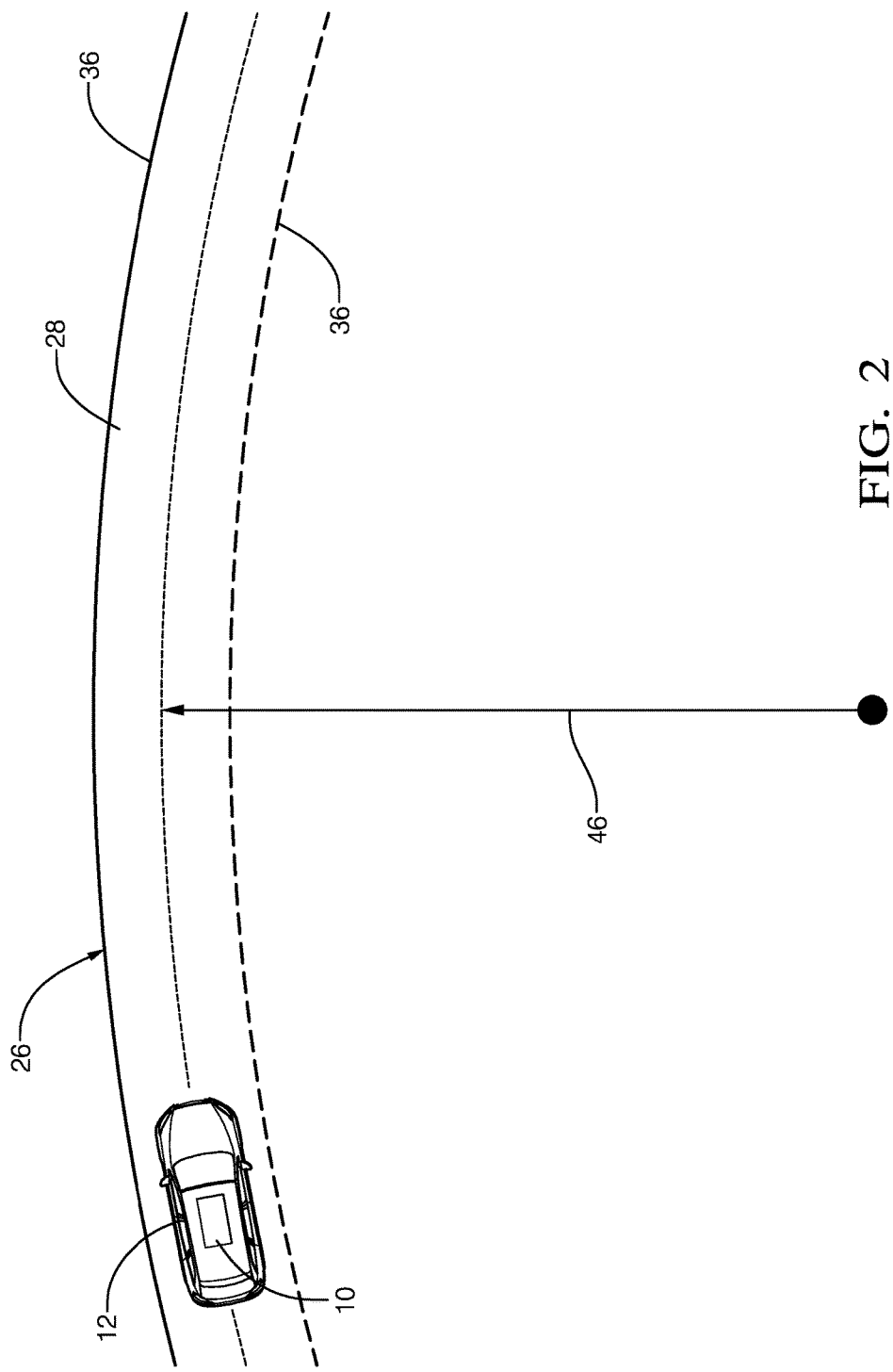
FIG. 2 is an illustration of a host-vehicle equipped with the warning system of FIG. 1 traveling on a curved roadway in accordance with one embodiment.

FIG. 2 illustrates the host-vehicle 12 equipped with the system 10 traveling in a travel-lane on a curved roadway 28. It will be understood that the operator 20 is turning the hand-wheel 18 in the clockwise direction in order to follow the roadway 28 in the direction of travel, thus creating the steering-angle 16 with positive values as described above.

Figure 3:
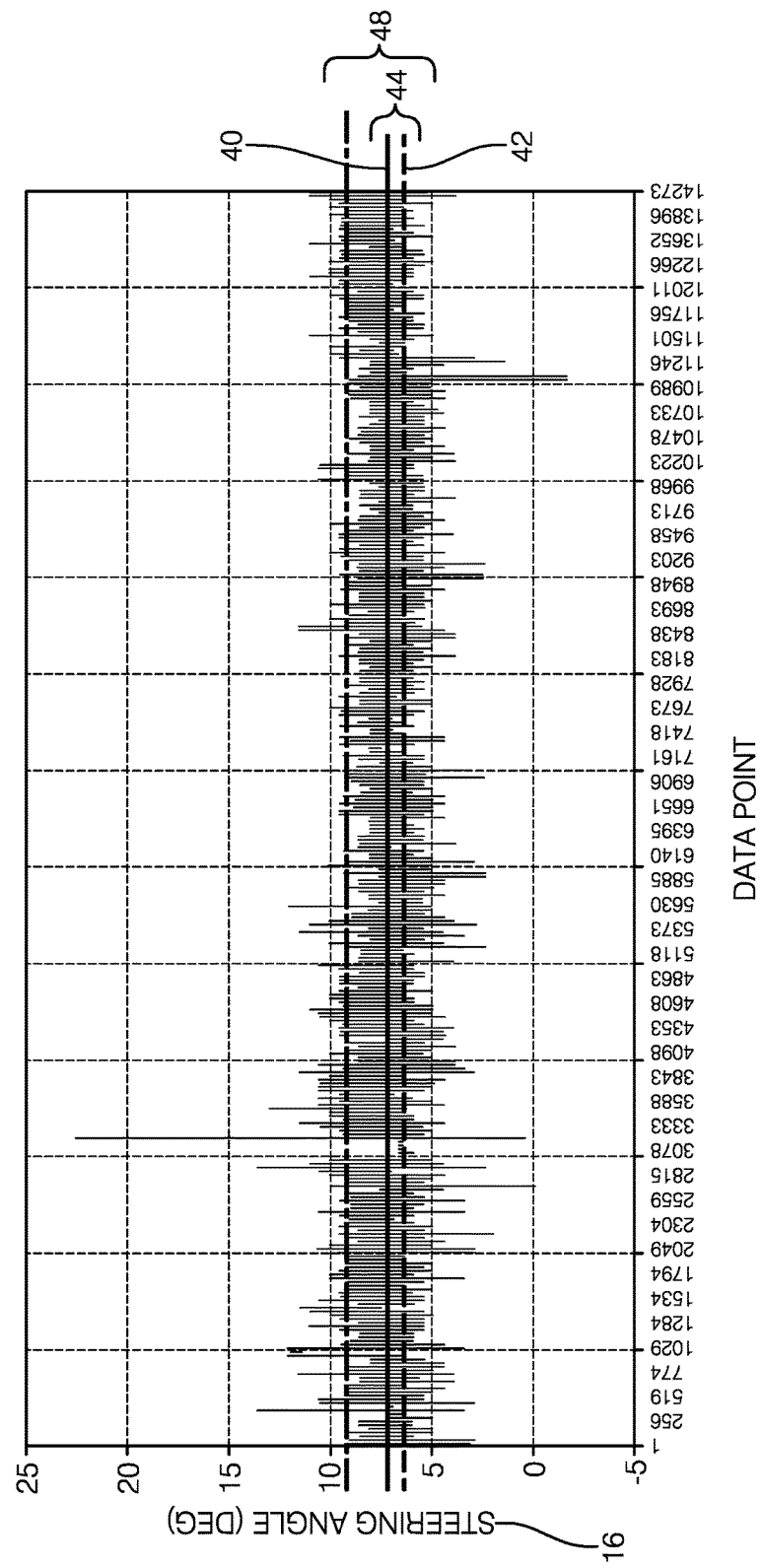
FIG. 3 is a plot of steering-angle data from the host-vehicle of FIG. 2 in accordance with one embodiment.

FIG. 3 is a plot of the detected steering-angle 16 data from the host-vehicle 12 of FIG. 2 traveling on the curved roadway 28 over a period of time, and is characterized by an average-steering-angle 40 of 7.3-degrees illustrated by the solid horizontal-line. The controller-circuit 32 is configured to determine the average-steering-angle 40 in accordance with the steering-angle 16 data indicated by the angle-detector 14. The steering-angle 16 data may be acquired at a predetermined rate (e.g., 10-milliseconds (10 ms)) and stored in the memory. The average-steering-angle 40 may be calculated based on the accumulated steering-angle 16 data over a period of between 3-minutes and 10-minutes. FIG. 3 also illustrates deviations of the steering-angle 16 in both the positive and negative directions about the average-steering-angle 40, with the largest positive deviation being 23-degrees at data point 3200, and the largest negative deviation being 1.5-degrees at data point 11,100.

The controller-circuit 32 is also configured to determine an expected-steering-angle 42 based on the curvature 26 detected by the curvature-detection-means 24. The inventor has discovered that determining the expected-steering-angle 42 for a distance of up to 200-meters ahead of host-vehicle 12 provides a sufficient balance between memory capacity requirements and accuracy of the expected-steering-angle 42 determination. Referring back to FIG. 2, the curvature-detection-means 24 detects the curvature 26 of the roadway 28 ahead of the host-vehicle 12 and is characterized by a radius-of-curvature 46. The controller-circuit 32 determines the expected-steering-angle 42 required to steer the host-vehicle 12 along a centerline of the travel-lane of the roadway 28 such that a centerline-curvature (i.e. the travel-path of the host-vehicle 12—not specifically shown) matches the radius-of-curvature 46 indicated by the curvature-detection-means 24. The expected-steering-angle 42 is illustrated by the dashed horizontal-line in FIG. 3. The controller-circuit 32 may include in the memory any properties of the host-vehicle 12, such as a turning-radius as a function of the steering-angle 16, or a dynamic model of the host-vehicle 12, with which to determine the expected-steering-angle 42.

The controller-circuit 32 is also configured to determine a steering-angle-deviation 44 based on the average-steering-angle 40 and the expected-steering-angle 42. That is, the controller-circuit 32 determines the steering-angle-deviation 44 by subtracting the average-steering-angle 40 from the expected-steering-angle 42 and is illustrated in FIG. 3. The controller-circuit 32 determines whether the steering-angle-deviation 44 is greater than a predetermined deviation-threshold 48 and, in accordance with the determination that the steering-angle-deviation 44 is greater than the deviation-threshold 48, determines a frequency 50 of the steering-angle-deviation 44 exceeding the deviation-threshold 48. That is, the controller-circuit 32 counts or records the occurrences of the steering-angle-deviation 44 exceeding the deviation-threshold 48, and the period of time between the occurrences, and may store the data in another location of the memory. The deviation-threshold 48 may be user defined, and is preferably greater than 15-degrees of steering-angle 16. In another embodiment, the deviation-threshold 48 is based on a speed of the host-vehicle 12 and is decreased when the speed of the host-vehicle 12 is less than a dynamic speed-threshold 54. The speed of the host-vehicle 12 is determined by a speed-sensor (not specifically shown) and may include a wheel-speed-sensor (not shown) typically found on automotive applications. Other sensors capable of determining the speed of the host-vehicle 12 may include, but are not limited to, a global-positioning-system (GPS) receiver (not shown), and a RADAR transceiver (not shown), and other devices as will be recognized by those skilled in the art.

The controller-circuit 32 activates the alert-device 38 when the frequency 50 of the steering-angle-deviation 44 exceeding the deviation-threshold 48 is greater than a change-threshold 52 that is indicative of driver fatigue. The change-threshold 52 may be user-defined and is preferably greater than three counts of occurrences of the steering-angle-deviation 44 exceeding the deviation-threshold 48 in less than 5-minutes of continuous drive-time (i.e. driving time without a key-off event).

Figure 4:
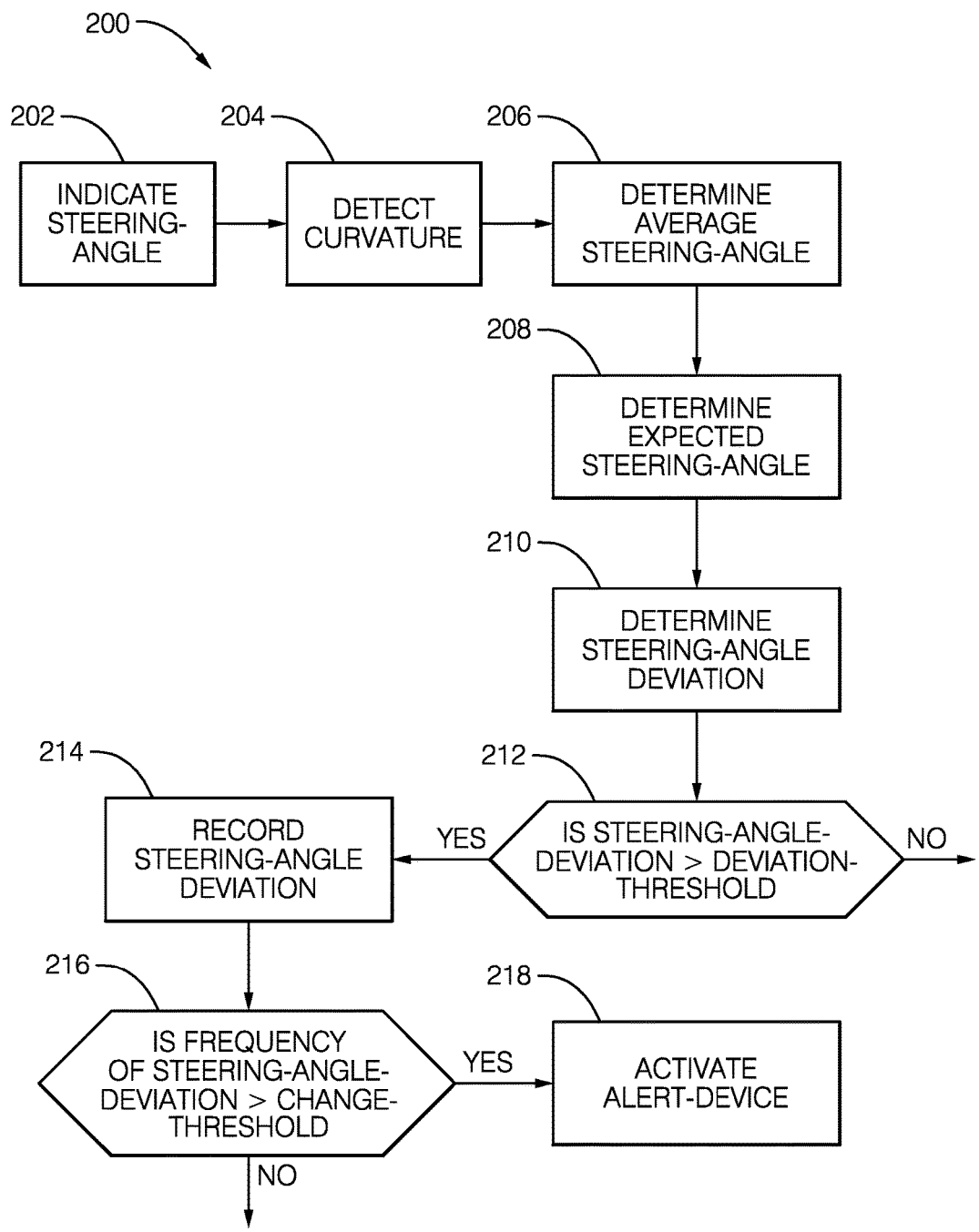
FIG. 4 is an illustration of a method of operating the warning system of FIG. 1 in accordance with another embodiment.

FIG. 4 is a flow chart that illustrates another embodiment of a detection method 200 of operating a warning system 10, hereafter referred to as the system 10, installed on a host-vehicle 12.

Step 202, INDICATE STEERING-ANGLE, includes indicating, with an angle-detector 14, a steering-angle 16 of a hand-wheel 18 of a host-vehicle 12.

Step 204, DETECT CURVATURE, includes detecting, with a curvature-detection-means 24, a curvature 26 of a portion of a roadway 28 traveled by the host-vehicle 12 where the portion of the roadway 28 is characterized as ahead of the host-vehicle 12 in the current direction of travel. The curvature-detection-means 24 may be a digital-map 30 or a camera 34 as described above.

Step 206, DETERMINE AVERAGE-STEERING-ANGLE, includes determining an average-steering-angle 40, with a controller-circuit 32 in communication with the angle-detector 14, the curvature-detection-means 24, and an alert-device 38.

Step 208, DETERMINE EXPECTED-STEERING-ANGLE, includes determining an expected-steering-angle 42 based on the curvature 26 of the roadway 28 detected by the curvature-detection-means 24.

Step 210, DETERMINE STEERING-ANGLE-DEVIATION, includes determining a steering-angle-deviation 44 based on a difference between the average-steering-angle 40 and the expected-steering-angle 42.

Step 212, determining whether the steering-angle-deviation 44 is greater than a deviation-threshold 48. The deviation-threshold 48 is preferably greater than 15-degrees of steering-angle 16. In another embodiment, the deviation-threshold 48 is based on a speed of the host-vehicle 12 and is decreased when the speed of the host-vehicle 12 is less than a dynamic speed-threshold 54.

Step 214, RECORD STEERING-ANGLE-DEVIATION, includes recording a frequency 50 of the steering-angle-deviation 44 in accordance with the determination that the steering-angle-deviation 44 is greater than the deviation-threshold 48.

Step 216, determining whether the frequency 50 of the steering-angle-deviation 44 is greater than a change-threshold 52 indicative of driver-fatigue. The change-threshold 52 is preferably greater than three counts of occurrences of the steering-angle-deviation 44 exceeding the deviation-threshold 48 in less than 5-minutes of continuous drive-time (i.e. driving time without a key-off event).

Step 218, ACTIVATE ALERT-DEVICE, includes activating the alert-device 38 with the controller-circuit 32, in accordance with the determination that the frequency 50 of the steering-angle-deviation 44 is greater than the change-threshold 52, alerting an operator 20 of the host-vehicle 12 of driver-fatigue.

In yet another embodiment, FIG. 1 illustrates a warning system 10 that includes a means 14 for detecting a steering-angle 16 of a hand-wheel 18 of a host-vehicle 12. The warning system 10 also includes a means 24 for detecting a curvature 26 of a portion of a roadway 28 (see FIG. 2) traveled by the host-vehicle 12 characterized as ahead of the host-vehicle 12. The warning system 10 also includes a means 38 for alerting an operator 20 of the host-vehicle 12. The warning system 10 also includes a means 32 for determining an average-steering-angle 40 in accordance with the steering-angle 16 indicated by the means 14 for detecting the steering-angle 16. The warning system 10 also includes a means 32 for determining an expected-steering-angle 42 based on the curvature 26 detected by the means 24 for detecting the curvature 26. The warning system 10 also includes a means 32 for determining a steering-angle-deviation 44 based on the average-steering-angle 40 and the expected-steering-angle 42. The warning system 10 also includes a means 32 for determining whether the steering-angle-deviation 44 is greater than a deviation-threshold 48. The warning system 10 also includes a means 32 for determining a frequency 50 of the steering-angle-deviation 44 in accordance with the determination that the steering-angle-deviation 44 is greater than the deviation-threshold 48. The warning system 10 also includes a means 32 for activating the means 38 for alerting the operator 20 when the frequency 50 of the steering-angle-deviation 44 exceeds a change-threshold 52 indicative of driver-fatigue.

Accordingly, a warning system 10 and a method 200 of operating the warning system 10 is provided. The system 10 reduces the rates of false driver-fatigue warnings by determining the expected-steering-angle 42 based on the curvature 26 of the roadway 28, which may help to reduce occurrences of operators 20 intentionally deactivating the warning system 10.

It will be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. Furthermore, the terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. Additionally, directional terms such as upper, lower, etc. do not denote any particular orientation, but rather the terms upper, lower, etc. are used to distinguish one element from another and locational establish a relationship between the various elements.

I claim:

1. A warning system, comprising:
   an angle-detector that indicates a steering-angle of a hand-wheel of a host-vehicle;
   a curvature-detection-means that detects a curvature of a portion of a roadway traveled by the host-vehicle, said portion characterized as ahead of the host-vehicle in a current direction of travel;
   an alert-device; and
   a controller-circuit in communication with the angle-detector, the curvature-detection-means, and the alert-device, the controller-circuit configured to:
   determine an average-steering-angle in accordance with the steering-angle indicated by the angle-detector;
   determine an expected-steering-angle based on the curvature detected by the curvature-detection-means;
   determine a steering-angle-deviation based on the average-steering-angle and the expected-steering-angle;
   determine whether the steering-angle-deviation is greater than a predetermined deviation-threshold;
   in accordance with the determination that the steering-angle-deviation is greater than the deviation-threshold determine a frequency of the steering-angle-deviation; and
   activate the alert-device when the frequency of the steering-angle-deviation exceeds a change-threshold.

2. The warning system in accordance with claim 1, wherein the curvature-detection-means is a digital-map that detects the curvature based on a location of the host-vehicle on the roadway.

3. The warning system in accordance with claim 1, wherein the curvature-detection-means is a camera that detects the curvature based on lane-markings on the roadway.

4. The warning system in accordance with claim 1, wherein the change-threshold is greater than three counts of occurrences of the steering-angle-deviation.

5. The warning system in accordance with claim 4, wherein the change-threshold is exceeded in less than five-minutes of continuous drive-time.

6. The warning system in accordance with claim 1, wherein the deviation-threshold is greater than 15-degrees of steering-angle.

7. The warning system in accordance with claim 1, wherein the deviation-threshold is based on a speed of the host-vehicle.

8. The warning system in accordance with claim 7, wherein the deviation-threshold is decreased when the speed of the host-vehicle is less than a dynamic speed-threshold.

9. A warning method, comprising:
  indicating, with an angle-detector, a steering-angle of a hand-wheel of a host-vehicle;
  detecting, with a curvature-detection-means, a curvature of a portion of a roadway traveled by the host-vehicle, said portion characterized as ahead of the host-vehicle in a current direction of travel;
  alerting, with an alert-device, an operator of the host-vehicle;
  determining an average-steering-angle, with a controller-circuit in communication with the angle-detector, the curvature-detection-means, and the alert-device, in accordance with the steering-angle indicated by the angle-detector;
  determining an expected-steering-angle based on the curvature detected by the curvature-detection-means;
  determining a steering-angle-deviation based on the average-steering-angle and the expected-steering-angle;
  determining whether the steering-angle-deviation is greater than a predetermined deviation-threshold;
  in accordance with the determination that the steering-angle-deviation is greater than the deviation-threshold;
  determining a frequency of the steering-angle-deviation in accordance with the determination that the steering-angle-deviation is greater than the deviation-threshold; and
  activating the alert-device when the frequency of the steering-angle-deviation exceeds a change-threshold.

10. The warning method in accordance with claim 9, wherein the curvature-detection-means is a digital-map that detects the curvature based on a location of the host-vehicle on the roadway.

11. The warning method in accordance with claim 9, wherein the curvature-detection-means is a camera that detects the curvature based on lane-markings on the roadway.

12. The warning method in accordance with claim 9, wherein the change-threshold is greater than three counts of occurrences of the steering-angle-deviation.

13. The warning method in accordance with claim 12, wherein the change-threshold is exceeded in less than five-minutes of continuous drive-time.

14. The warning method in accordance with claim 9, wherein the deviation-threshold is greater than 15-degrees of steering-angle.

15. The warning method in accordance with claim 9, wherein the deviation-threshold is based on a speed of the host-vehicle.

16. The warning method in accordance with claim 15, wherein the deviation-threshold is decreased when the speed of the host-vehicle is less than a dynamic speed-threshold.

17. A warning system, comprising:
  a means for detecting a steering-angle of a hand-wheel of a host-vehicle;
  a means for detecting a curvature of a portion of a roadway traveled by the host-vehicle, said portion characterized as ahead of the host-vehicle;
  a means for alerting an operator of the host-vehicle;
  a means for determining an average-steering-angle in accordance with the steering-angle indicated by the means for detecting the steering-angle;
  a means for determining an expected-steering-angle based on the curvature detected by the means for detecting the curvature;
  a means for determining a steering-angle-deviation based on the average-steering-angle and the expected-steering-angle;
  a means for determining whether the steering-angle-deviation is greater than a deviation-threshold;
  a means for determining a frequency of the steering-angle-deviation in accordance with the determination that the steering-angle-deviation is greater than the deviation-threshold; and
  a means for activating the means for alerting the operator when the frequency of the steering-angle-deviation exceeds a change-threshold indicative of driver-fatigue.

* * * * *